United States Patent
Chen et al.

(10) Patent No.: US 12,299,498 B2
(45) Date of Patent: May 13, 2025

(54) ASSIGNING COMPUTER WORKLOADS TO NODES BASED ON ENERGY CONSUMPTION MODES OF THE NODES

(71) Applicant: Red Hat, Inc., Raleigh, NC (US)

(72) Inventors: Huamin Chen, Westboro, MA (US); Chen Wang, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 502 days.

(21) Appl. No.: 17/700,584

(22) Filed: Mar. 22, 2022

(65) Prior Publication Data

US 2023/0305905 A1  Sep. 28, 2023

(51) Int. Cl.
*G06F 3/00* (2006.01)
*G06F 9/50* (2006.01)
*H04L 67/61* (2022.01)

(52) U.S. Cl.
CPC .......... *G06F 9/5083* (2013.01); *G06F 9/5038* (2013.01); *G06F 9/5044* (2013.01); *H04L 67/61* (2022.05); *G06F 2209/508* (2013.01)

(58) Field of Classification Search
CPC ........................................................ G06F 9/50
See application file for complete search history.

(56) References Cited

U.S. PATENT DOCUMENTS

| 9,557,792 | B1 * | 1/2017 | Potlapally | G06F 1/3206 |
| 10,180,905 | B1 * | 1/2019 | Meier | G06F 12/0862 |
| 11,042,209 | B2 | 6/2021 | Stoffel et al. | |
| 11,093,135 | B1 * | 8/2021 | Ali | G06F 1/3206 |
| 11,586,563 | B2 * | 2/2023 | Ruttenberg | G06F 13/1668 |
| 2009/0125739 | A1 * | 5/2009 | Satoh | G06F 1/3284 713/324 |

(Continued)

FOREIGN PATENT DOCUMENTS

| CN | 111209104 A | 5/2020 |
| CN | 111694633 A | 9/2020 |

(Continued)

OTHER PUBLICATIONS

Ruilong Deng, Optimal Workload Allocation in Fog-Cloud Computing Toward Balanced Delay and Power Consumption. (Year: 2016).*

(Continued)

*Primary Examiner* — Lechi Truong
(74) *Attorney, Agent, or Firm* — Kilpatrick Townsend & Stockton LLP

(57) ABSTRACT

Computer workloads can be assigned to nodes of a distributed computing environment based on energy consumption modes employed by the nodes. In one example, a system can determine a first tag assigned to a workload. The first tag can indicate a compatibility of the workload with one or more energy consumption modes employable by one or more nodes of a distributed computing environment. The system can also determine a second tag assigned to a node of the distributed computing environment. The second tag can indicate an energy consumption mode employed by the node. The system can then determine a correspondence between the first tag and the second tag indicating that the workload is compatible with the energy consumption mode employed by the node. Based on determining the correspondence between the first tag and the second tag, the system can assign the workload to the node.

20 Claims, 6 Drawing Sheets

(56) References Cited

U.S. PATENT DOCUMENTS

| | | | | |
|---|---|---|---|---|
| 2012/0290862 | A1* | 11/2012 | Brown | H04L 41/0833 |
| | | | | 713/320 |
| 2013/0086404 | A1* | 4/2013 | Sankar | G06Q 50/06 |
| | | | | 713/320 |
| 2014/0068627 | A1* | 3/2014 | Goh | G06F 9/5094 |
| | | | | 718/105 |
| 2014/0075222 | A1* | 3/2014 | Jackson | G06F 1/329 |
| | | | | 713/320 |
| 2016/0054780 | A1* | 2/2016 | Bodas | G06F 1/30 |
| | | | | 713/320 |
| 2016/0111884 | A1* | 4/2016 | Kouno | H02J 9/06 |
| | | | | 307/115 |
| 2017/0168534 | A1* | 6/2017 | Lefurgy | G05F 1/625 |
| 2017/0255240 | A1* | 9/2017 | Matteson | G06F 9/5094 |
| 2018/0027058 | A1* | 1/2018 | Balle | H04L 69/04 |
| 2018/0027060 | A1* | 1/2018 | Metsch | H04L 49/357 |
| 2018/0027066 | A1* | 1/2018 | Van De Groenendaal | |
| | | | | G06F 1/183 |
| 2018/0314308 | A1* | 11/2018 | Savidis | G06F 9/4893 |
| 2019/0102314 | A1* | 4/2019 | Wang | H04W 52/246 |
| 2019/0173765 | A1* | 6/2019 | Bertran | H04L 41/147 |
| 2019/0286214 | A1* | 9/2019 | Pabalkar | G06F 1/3228 |
| 2020/0132778 | A1* | 4/2020 | Thompson | G01R 31/388 |
| 2020/0167196 | A1* | 5/2020 | Smith | H04L 41/5054 |
| 2020/0228626 | A1* | 7/2020 | Bernat | H04L 47/83 |
| 2020/0249734 | A1* | 8/2020 | Kennedy | G06F 1/28 |
| 2021/0120703 | A1* | 4/2021 | Subrahmanyam | |
| | | | | H05K 7/20272 |
| 2021/0365290 | A1 | 11/2021 | Zhang et al. | |
| 2021/0397476 | A1* | 12/2021 | Liu | G06F 9/5094 |
| 2022/0169479 | A1* | 6/2022 | Paakkinen | B66B 1/308 |
| 2023/0102063 | A1* | 3/2023 | Wong | G06F 9/5044 |
| | | | | 718/102 |
| 2023/0297508 | A1* | 9/2023 | Zirr | G06F 12/0837 |
| | | | | 711/128 |
| 2023/0298126 | A1* | 9/2023 | Woop | G06T 15/06 |
| | | | | 345/557 |
| 2023/0350696 | A1* | 11/2023 | Harwani | G06F 1/206 |
| 2024/0249045 | A1* | 7/2024 | Jia | G06F 11/3062 |

FOREIGN PATENT DOCUMENTS

| | | | |
|---|---|---|---|
| CN | 113434034 A | | 9/2021 |
| JP | 2021131759 A | * | 9/2021 |
| KR | 20210157246 A | | 4/2021 |

OTHER PUBLICATIONS

A. K. Agrawala, AN APPROAiTHIE To Workload CH1AIRACTEIRIATION Problem. (Year: 1976).*

Mehta, H. K., et al., "WattsApp: Power-Aware Container Scheduling," Association for Computing Machinery, 2020, https://doi.org/10.1145/1122445.1122456.

* cited by examiner

ASSIGNING COMPUTER WORKLOADS TO NODES BASED ON ENERGY CONSUMPTION MODES OF THE NODES

TECHNICAL FIELD

The present disclosure relates generally to scheduling computer workloads in a distributed computing environment. More specifically, but not by way of limitation, this disclosure relates to assigning workloads to nodes of a distributed computing environment based on energy consumption modes employed by the nodes, which may improve energy conservation across the distributed computing environment.

BACKGROUND

Distributed computing environments such as cloud computing environments and computing clusters have recently grown in popularity. These distributed computing environments may include dozens or hundreds of nodes interconnected via one or more networks. The nodes can be physical machines executing software processes, such as microservices, serverless functions, and applications. The nodes can execute the software processes to service various types of computer workloads ("workloads"), such as video conferencing, web surfing, voice communications, and data processing workloads. A workload scheduler within the distributed computing environment can distribute the workloads among the nodes in a process referred to as scheduling. The workload scheduler can determine how to schedule the workloads on the nodes based on one or more factors.

DETAILED DESCRIPTION

Figure 1:
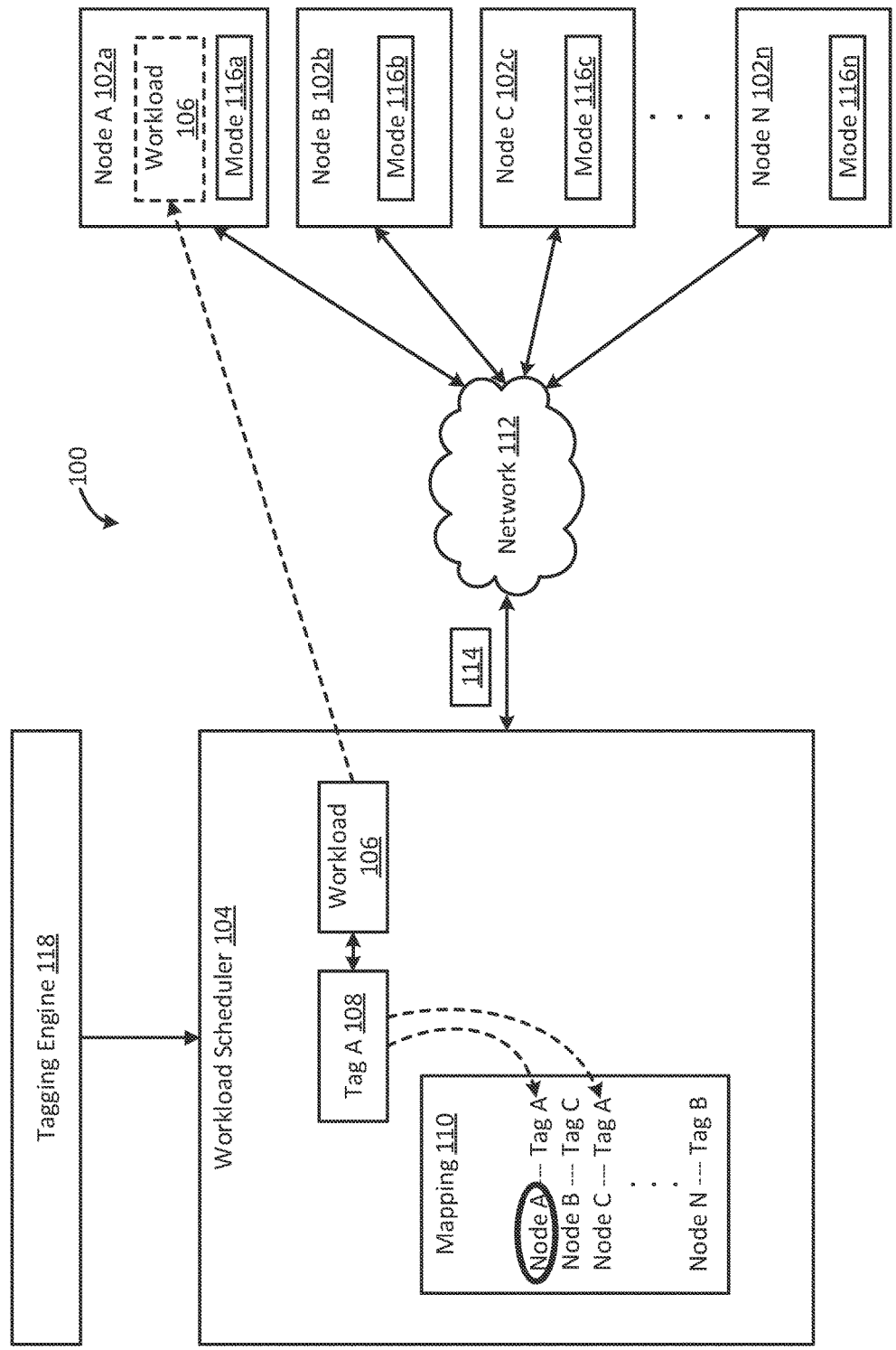
FIG. 1 is a block diagram of an example of a system for assigning computer workloads to nodes according to some aspects of the present disclosure.

A distributed computing environment may include dozens or hundreds of nodes and a workload scheduler for assigning workloads to the nodes. The nodes can consume significant amounts of electrical energy, which is a growing concern. One reason for this significant energy consumption is that some or all of the nodes may have their processors preset to high clock-frequencies. The nodes may be tuned in this manner during their initial provisioning to achieve high performance and their clock frequencies may remain fixed thereafter. But this high-performance tuning can lead to higher energy consumption that may be unnecessary in some circumstances. For example, the high-performance tuning may be overkill for some types of workloads that have quality-of-service (QoS) objectives capable of being satisfied at lower clock-frequencies that would consume less electrical energy. But conventional systems fail to take these energy considerations into account, leading to higher overall energy consumption.

Some examples of the present disclosure can overcome one or more of the abovementioned problems by enabling nodes of a distributed computing environment to dynamically switch between energy consumption modes to improve their energy usage. Workloads can then be distributed among the nodes based on each workload's compatibility with the energy consumption modes enabled on the nodes. A workload can be considered to be "compatible" with an energy consumption mode if the workload can be serviced by a node operating in the energy consumption mode without violating one or more predefined constraints on the workload. A workload can be considered to be "incompatible" with an energy consumption mode if the workload cannot be serviced by a node operating in the energy consumption mode without violating one or more predefined constraints on the workload. Using these techniques, the nodes can reduce their energy usage without significantly impacting the workloads, thereby improving the overall energy consumption of the system.

More specifically, the nodes may each be capable of operating in one or more energy consumption modes. In each energy consumption mode, the node's processor may be set to a certain clock frequency that is different from the clock frequencies associated with other energy consumption modes. Different clock frequencies can yield different amounts of energy consumption by the processor. During the course of operation, each node may switch between two or more energy consumption modes in response to various events or in accordance with one or more predefined algorithms, which may reduce the energy consumption of the nodes. Energy optimization algorithms may be employed to improve energy consumption across the nodes.

Different workloads may be compatible with different energy consumption modes. For example, a first workload may be a data-processing workload that can tolerate a reasonable amount of latency. As a result, the first workload may be compatible with a first energy-consumption mode in which a node's processor is set to a lower clock frequency that reduces energy consumption. On the other hand, a second workload may be a video streaming service that requires low latency. As a result, the second workload may be incompatible with the first energy-consumption mode. The second workload may instead be compatible with a second energy-consumption mode in which a node's processor is set to a higher clock frequency that increases energy consumption. In some examples, the workload scheduler can account for these compatibility issues by distributing workloads among the nodes based on each workload's compatibility with the energy consumption modes active on the nodes.

To determine how to distribute the workloads, the workload scheduler can begin by communicating with the nodes to determine the energy consumption modes that are currently active (e.g., enabled) on the nodes. In some cases, each energy consumption mode can correspond to a certain tag. To indicate which energy consumption mode is active on a given node, the node can provide the corresponding tag to the workload scheduler. Such tags can be referred to as node tags. Next, the workload scheduler can determine the compatibility of a workload with various energy consumption modes. For example, the workload scheduler can determine that a workload is compatible with one or more energy consumptions modes based on one or more factors, such as a QoS constraint or another constraint applicable to the workload, the characteristics of the workload, metadata associated with the workload, a user preference, or any combination of these. Having determined the energy consumptions modes with which the workload is compatible, the workload scheduler can assign a tag to the workload. The tag can be referred to as a workload tag and indicate one or more energy consumption modes with which the workload is compatible. If the workload is compatible with multiple energy consumption modes, the workload scheduler can select the most-permissive energy consumption mode and assign a corresponding tag to the workload.

Having determined the node tags and the workloads tags, the workload scheduler can next determine which nodes are operating in an energy consumption mode with which the workload is compatible. For example, the workload scheduler can compare the workload tag to the node tags to determine which node tags match the workload tag. Such matches can indicate that the workload is compatible with the energy consumption modes that are active on the nodes. If the workload is compatible with an energy consumption mode operating on a node, the workload scheduler can assign the workload to that node. If the workload is not compatible with any of the energy consumption modes operating on the nodes, the workload can be queued until at least one of the nodes begins operating in an energy consumption mode with which the workload is compatible. If the workload is compatible with multiple energy consumption modes operating on multiple nodes, the workload scheduler can select one of the nodes for the workload based on a predefined prioritization scheme or a random selection process. In this way, workloads can be assigned to nodes in a manner that enables the nodes to take advantage of energy reduction mechanisms while reducing the impact on the workloads.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for assigning computer workloads to nodes according to some aspects of the present disclosure. In this example, the system 100 is a distributed computing environment, such as a cloud computing environment, computing cluster, or data grid. The system 100 includes multiple nodes 102a-n that may be communicatively coupled to one another via one or more networks 112, such as a local area network or the Internet. The nodes 102a-n can execute software processes to service various types of workloads for clients. For example, the nodes 102a-n may execute software processes configured to service data-processing workloads submitted by the clients and return the results thereof back to the clients.

The nodes 102a-n can each have their own processors (e.g., central processing units or graphics processing units) capable of dynamically switching between multiple clock frequencies. During operation, each of the nodes 102a-n can automatically switch between two or more clock frequencies in response to detecting events or in accordance with a predefined algorithm. For example, the nodes 102a-n may implement dynamic voltage frequency scaling (DVFS) to automatically switch their processors between different clock-frequencies in response to certain events. Examples of such events can include a processor load exceeding a threshold, a processor temperature exceeding a threshold, receipt of a signal from a cooling system, the occurrence of a particular time of day or date, a determination that more than a threshold number of nodes are already operating at a particular clock-frequency, a failure of a running software process, a deployment of a new software process, or any combination of these. The nodes 102a-n may be configured to switch between clock frequencies in a manner that optimizes, or otherwise reduces, their energy usage.

Each of the clock frequencies can correspond to an energy consumption mode, since the processor will consume a different amount of energy when operating at each clock frequency. At any given point in time, each of the nodes 102a-n will be operating in an energy consumption mode 116a-n that may be the same as or different from one or more of the other nodes 102a-n of the system 100. The energy consumption modes 116a-n that are currently active on the nodes 102a-n can be referred to as active energy-consumption modes. Upon entering a particular energy-consumption mode, each node 102a-n can store a tag indicative of that mode. The nodes 102a-n may provide these node tags to a workload scheduler 104 for use in a remainder of the process, as described later on.

As workloads are generated in the system 100, the system 100 can automatically determine one or more energy consumption modes with which the workloads are compatible. For example, the system 100 can include a tagging engine 118, such as a web-hooked controller or another software service, that can automatically detect the creation of a workload 106 and responsively determine one or more energy consumption modes with which the workload 106 is compatible. The tagging engine 118 can make this determination based on one or more factors. Examples of such factors can include one or more characteristics of the workload, such as a type, duration, timestamp, size, or user associated with the workload; one or more QoS constraints associated with the workload, such as a latency constraint or a performance constraint; one or more other constraints on the workload; metadata associated with the workload, such as configuration data or complementary information provided with the workload; a user preference, such as a preferred energy-consumption mode selected by a user associated with the workload; a privilege of a user associated with the workload, such as a subscription level or access level associated with a user submitting the workload; or any combination of these.

In some examples, two or more of the factors analyzed by the tagging engine 118 may conflict with one another. In such circumstances, the tagging engine 118 may implement a predefined prioritization scheme to resolve the conflict. For example, the tagging engine 118 may determine that the workload 106 is of a particular type that is compatible with a first energy-consumption mode. The tagging engine 118 may also determine that a QoS constraint on the workload 106 requires a second energy-consumption mode. So, the tagging engine 118 may prioritize this requirement and determine that the workload 106 is compatible with the second energy-consumption mode and not the first energy-consumption mode.

Having determined one or more energy consumption modes with which the workloads are compatible, the tagging engine 118 can next assign tags to the workloads. For example, the tagging engine 118 can assign tag 108 to workload 106. Each of the tags can indicate the one or more energy consumption modes with which the corresponding workload is compatible. The tags can have any suitable format. For example, the tags can be letters or numbers ranging between two boundary values (e.g., 1-5), where each tag indicates at least one energy consumption mode with which a workload is compatible.

In some examples, a tag may indicate that a workload is compatible with multiple energy consumption modes. For example, the tagging engine 118 may assign a particular tag 108 to a workload 106, where the particular tag 108 indicates that a workload 106 is compatible with an energy consumption mode in which a processor is operating at a particular frequency, such as 3.5 gigahertz (GHz). But, this may also inherently mean that the workload 106 is compatible with other energy-consumption modes in which the processor is operating at higher clock frequencies than that particular frequency, since the workload may also be inherently compatible with faster clock frequencies. In this way, the assigned tag 108 may represent the lowest energy-consumption mode (involving the lowest clock frequency and lowest amount of energy consumption) with which the workload 106 is compatible, given that the workload 106 may also be compatible wither higher energy-consumption modes (involving faster clock frequencies and higher energy consumption). After assigning a tag 108 to a workload 106, the tagging engine 118 may notify the workload scheduler 104 of the tag 108 assigned to the workload 106.

The workload scheduler 104 can also be part of (e.g., a node of) the distributed computing environment. The workload scheduler 104 can be communicatively coupled to other the nodes 102a-n via the one or more networks 112. In the depicted arrangement, the workload scheduler 104 can be considered a control node or master node and the other nodes 102a-n may be considered worker nodes or slave nodes, respectively. The workload scheduler 104 can include a workload scheduling service configured to distribute workloads among the nodes 102a-n.

As noted above, the workload scheduler 104 can receive the workload tags from the tagging engine 118 and the node tags from the nodes 102a-n. To receive the node tags from the nodes 102a-n, the workload scheduler 104 may periodically poll 114 or otherwise communicate with the nodes 102a-n to receive their node tags. Each of the nodes 102a-n can provide its corresponding tag to the workload scheduler 104. The node tags can indicate which energy consumption modes 116a-n are currently active on the nodes 102a-n at a given point in time. The node tags can be in any suitable format, which may be the same as or different from the workload tags. For example, the node tags can be numbers or letters ranging between two boundary values (e.g., A-D), where each node tag indicates an energy consumption mode that is currently active on a given node at a given point in time. The workload scheduler 104 can periodically communicate with the nodes 102a-n to determine their current tags, which may dynamically change over time.

Having received the node tags, in some examples the workload scheduler 104 can generate a mapping 110 that correlates the node tags to their respective nodes 102a-n. For example, the mapping 110 can correlate unique identifiers (e.g., names, IP addresses, etc.) of the nodes to their corresponding tags. The mapping 110 may be stored on the workload scheduler 104 or elsewhere in the system 100, so long as the location is accessible to the workload scheduler 104. The workload scheduler 104 can update the mapping 110 over time as the node tags change, so that the mapping 110 remains current.

Next, the workload scheduler 104 can match workload tags to node tags in the mapping 110. This can involve the workload scheduler 104 determining that a workload tag 108 corresponds to one or more node tags listed in the mapping 110. There can be a "correspondence" between a workload tag and a node tag if the two tags are the same (e.g., both tags have a value of "A"). There can also be a "correspondence" between a workload tag and a node tag if the two tags are different from one another but there is a predefined correlation between the two tags (e.g., a workload tag value of "1" corresponds to a node tag value of "A"). Such predefined correlations may be stored in a data structure that is on, or otherwise accessible to, the workload scheduler 104. The predefined relationships may be supplied by default or input by a user.

After the workload scheduler 104 determines a correspondence between a workload tag 108 and one or more node tags, the workload scheduler 104 can use the mapping 110 to identify one or more of the nodes 102a-n associated with the one or more node tags. For example, as shown in FIG. 1, the workload 106 can be assigned Tag A. And Tag A corresponds to both node A and node C in the mapping 110, as indicated by the dashed arrows. So, the workload scheduler 104 can identify node A and node C as candidate nodes to which the workload 106 may be assigned. While in this example there are two candidate nodes (Nodes A and C) to which the workload 106 may be assigned, in other examples there may be more or fewer candidate nodes to which the workload 106 may be assigned.

With the candidate nodes identified, the workload scheduler 104 may select among the candidate nodes. This may be achieved through random selection or through a predefined prioritization scheme. The predefined prioritization scheme may be configured to select among the candidate nodes based on their characteristics, such as their current resource usage or projected resource usage, or based on other factors. Once the workload scheduler 104 selects one of the candidate nodes, the workload scheduler 104 can then schedule the workload 106 to the candidate node. In the example shown in FIG. 1, the workload scheduler 104 has selected node A for the workload 106, as indicated by the bolded oval. So, the workload scheduler 104 can assign the workload 106 to the selected node 102a, as represented by a dashed arrow in FIG. 1. The node 102a may then execute the workload 106 and return a result thereof, for example to a corresponding client device.

It will be appreciated that the example shown in FIG. 1 is intended to be illustrative and non-limiting. Other examples may involve more components, fewer components, different components, or a different arrangement of the components shown in FIG. 1. For instance, the tagging engine 118 may be part of the workload scheduler 104 rather than separate from it, in another example.

Figure 2:
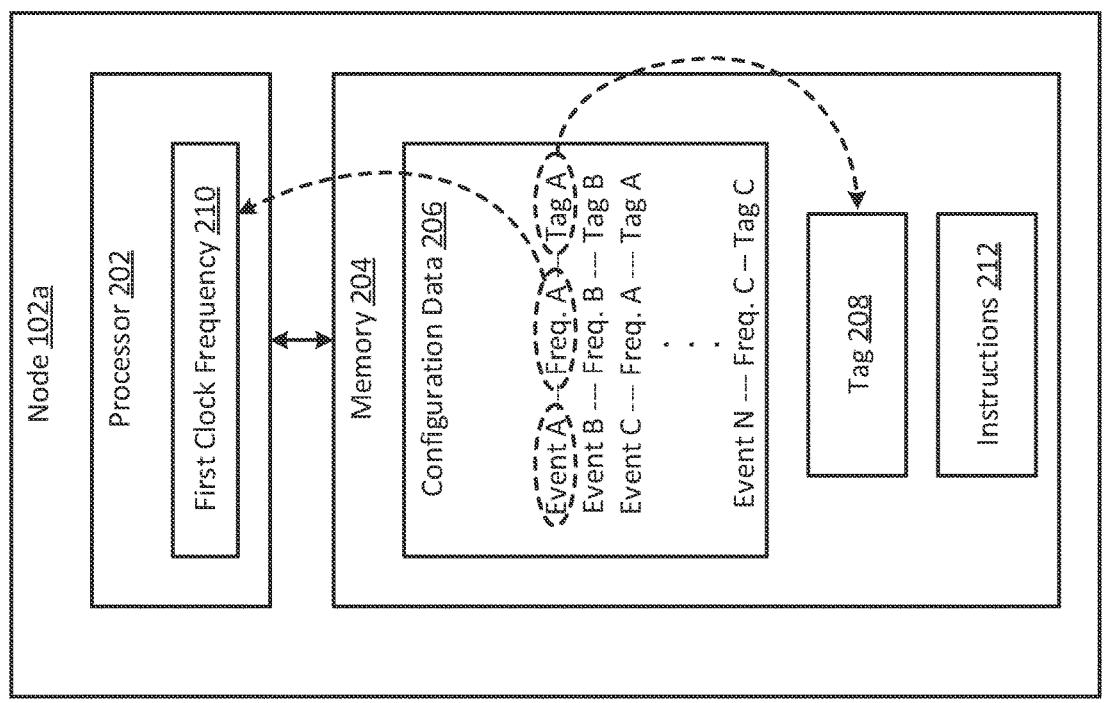
FIG. 2 is a block diagram of an example of a node in a first energy-consumption mode according to some aspects of the present disclosure.

FIG. 2 is a block diagram of an example of a node 102a in a first energy-consumption mode according to some aspects of the present disclosure. The node 102 includes a processor 202 communicatively coupled to a memory 204. The processor 202 can include one processing device or multiple processing devices. Non-limiting examples of the processor 202 include a Field-Programmable Gate Array (FPGA), an application-specific integrated circuit (ASIC), a microprocessor, etc. The processor 202 can execute instructions 212 stored in the memory 204 to perform the operations. In some examples, the instructions 212 can include processor-specific instructions generated by a compiler or an interpreter from code written in any suitable computer-programming language, such as C, C++, C #, etc.

Memory 204 can include one memory device or multiple memory devices. The memory 204 can be non-volatile and may include any type of memory device that retains stored information when powered off. Non-limiting examples of the memory 204 include electrically erasable and programmable read-only memory (EEPROM), flash memory, or any other type of non-volatile memory. At least some of the memory 204 can include a non-transitory computer-readable medium from which the processor 202 can read instructions 212. A computer-readable medium can include electronic, optical, magnetic, or other storage devices capable of providing the processor 202 with computer-readable instructions 212 or other program code. Examples of a computer-readable medium can include magnetic disks, memory chips, ROM, random-access memory RAM, an ASIC, a configured processor, optical storage, or any other medium from which a computer processor can read instructions 212.

In the example shown in FIG. 2, the memory 204 can also store configuration data 206. The configuration data 206 can include one or more mappings between events, clock frequencies, and node tags. The configuration data 206 can specify which events are to trigger changes to the processor's clock frequency (e.g., switches between energy consumption modes). The configuration data 206 can also specify the clock frequencies corresponding to those events. The node 102a can detect the occurrence of events listed in the configuration data 206 and responsively set the processor 202 to the corresponding clock frequency listed in the configuration data 206.

In some examples, the configuration data 206 can also specify tags that correspond to the events or clock frequencies. In response to detecting an event, the node 102a can use the configuration data 206 to determine a tag value corresponding to the event and update the node's tag 208 to that tag value. In this way, the tag 208 can be updated over time as the clock frequency of the processor 202 changes. As a result, the tag can indicate which clock frequency (and thus which energy consumption mode) is currently active on the node 102a.

One specific example is shown in FIG. 2. As shown, the node 102a can detect Event A listed in the configuration data 206. In response to detecting this event, the node 102a can determine a clock frequency (Freq. A) corresponding to the event based on the configuration data 206. The node 102a can then set the processor 202 to that clock frequency, which can be referred to as a first clock frequency 210. The node 102a can also determine a tag value (e.g., Tag A) corresponding to the first clock frequency 210 based on the configuration data 206. Having determined the tag value, the node 102a can update its tag 208 to have the tag value. The tag value can indicate that the processor 202 is operating at the first clock frequency 210 and consequently is operating in a first energy-consumption mode. If a workload 106 is compatible with the first energy-consumption mode, the workload 106 may then be assigned to the node 102a by the workload scheduler.

Figure 3:
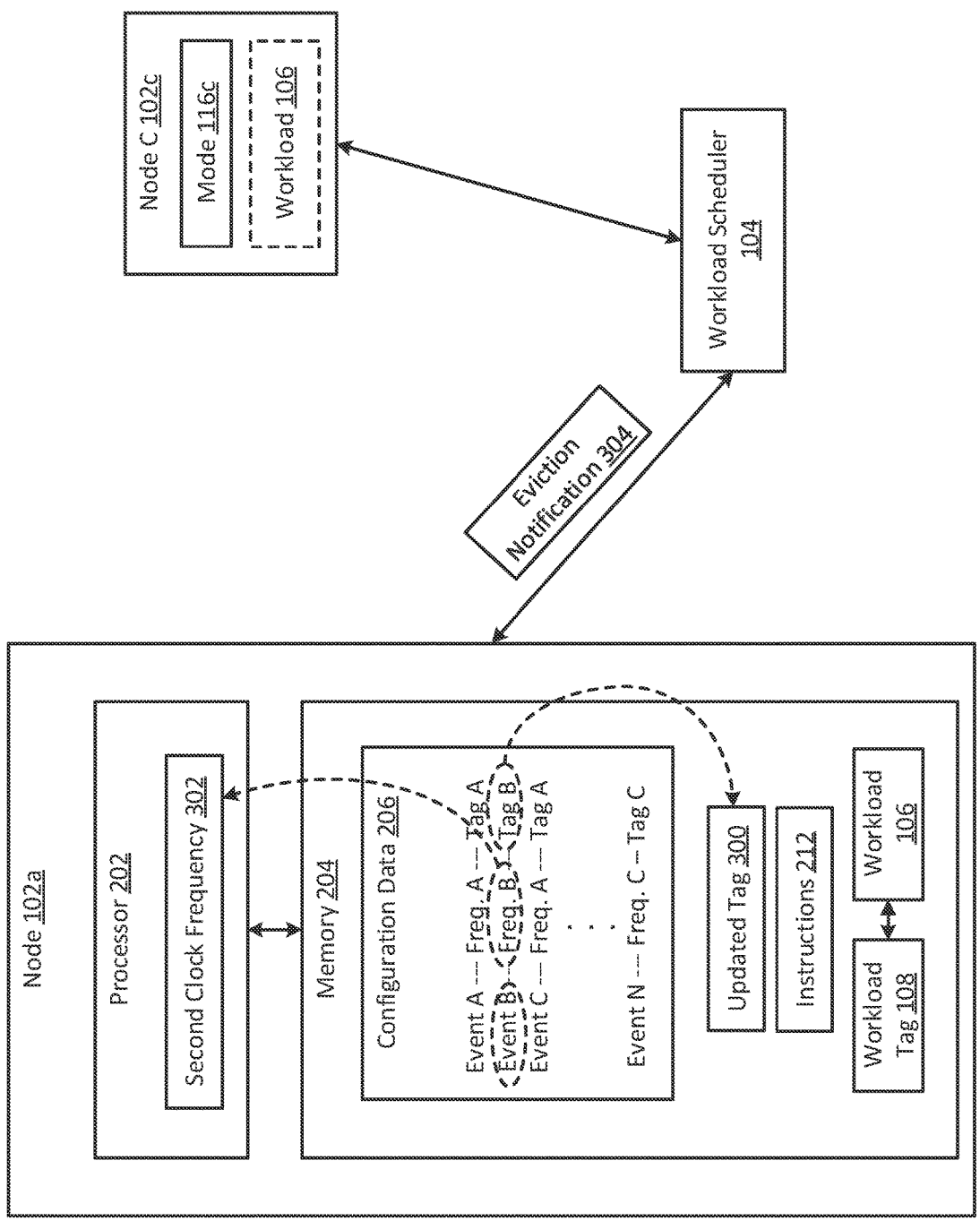
FIG. 3 is a block diagram of an example of a node in a second energy-consumption mode according to some aspects of the present disclosure.

At a later point in time, the node 102a may switch to a second energy-consumption mode. For example, referring to FIG. 3, the node 102a can detect Event B listed in the configuration data 206. In response to detecting this event, the node 102a can determine a clock frequency (Freq. B) corresponding to the event based on the configuration data 206. The node 102a can then set the processor 202 to that clock frequency, which can be referred to as a second clock frequency 302. It will be appreciated the use of ordinal terms herein such as "first" and "second" is not intended to connote any priority, precedence, or order of one element over another, but rather to distinguish one element having a certain name from another element having a similar name. In addition to setting the clock frequency of the processor 202, the node 102a can also determine a new tag value (e.g., Tag B) corresponding to the second clock frequency 302 based on the configuration data 206. Having determined the new tag value, the node 102a can update its tag, so as to generate an updated tag 300 with the new tag value. The new tag value can indicate that the processor 202 is now operating at the second clock frequency 302 and consequently is operating in the second energy-consumption mode.

Given this change to the processor's clock frequency, the workload 106 may no longer be compatible with the node 102a. That is, the workload 106 may not be compatible with the second energy-consumption mode in which the node 102a is now operating. In some examples, the node 102a can detect this incompatibility. For example, the node 102a can determine whether the updated tag 300 corresponds to (e.g., matches) the workload tag 108 associated with the workload 106. The workload tag 108 may have been previously provided to the node 102a by the workload scheduler for this purpose, for example upon the workload scheduler assigning the workload 106 to the node 102a or at another prior point in time. If the workload tag 108 does not correspond to the updated tag 300, it may mean that the workload 106 is no longer compatible with the node 102a. So, the node 102a can evict the workload 106 from the node 102a. This may involve the node 102a stopping any running processes related to the workload 106 and transmitting an eviction notification 304 to the workload scheduler 104. The eviction notification 304 can indicate that the workload 106 was evicted from the node 102a and why. In response to receiving the eviction notification 304, the workload scheduler 104 may then repeat some or all of the abovementioned processes to assign the workload 106 to a new node 102c with which the workload 106 is compatible.

Figure 4:
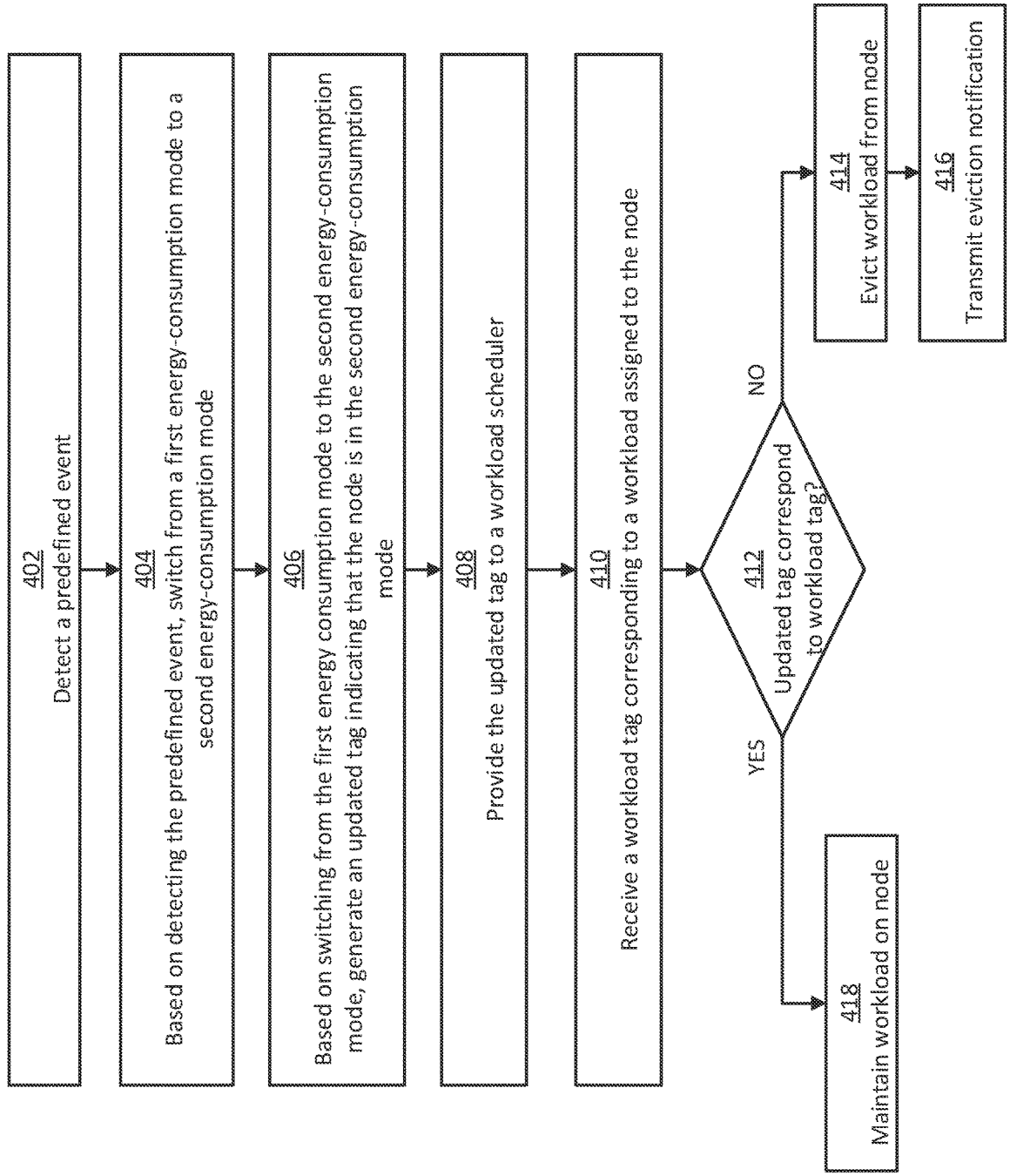
FIG. 4 is a flow chart of an example of a process capable of being implemented by a node according to some aspects of the present disclosure.

FIG. 4 is a flow chart of an example of a process capable of being implemented by a node 102a according to some aspects of the present disclosure. Other examples may include more operations, fewer operations, different operations, or a different order of the operations shown in FIG. 4. The operations of FIG. 4 will now be described below with reference to the components of FIGS. 1-3 above.

In block 402, the node 102a (e.g., the node's processor 202) detects a predefined event. The predefined event can be an event listed or defined in configuration data 206. The configuration data 206 may be default configuration data or custom configuration data that has been created or modified by a user.

In block 404, the node 102a switches from a first energy-consumption mode to a second energy-consumption mode based on detecting the predefined event. This may involve updating the clock frequency of a processor 202 of the node 102a from a first clock frequency 210 in which the processor 202 consumes a first amount of electrical energy to a second clock frequency 302 in which the processor 202 consumes a second amount of electrical energy, where the second amount of electrical energy is different from the first amount of electrical energy. To effectuate this switch, the processor 202 of the node 102a may transmit one or more control signals to control circuitry configured to govern the clock frequency of the processor 202. The control circuitry may be internal or external to the processor 202 itself.

In block 406, the node 102a generates an updated tag 300 for the node 102a based on switching from the first energy-consumption mode to the second energy-consumption mode. The updated tag 300 can indicate that the node 102a is in the second energy-consumption mode. Generating the updated tag 300 may involve identifying a new tag value that corresponds to the second energy-consumption mode (e.g., using the configuration data 206) and setting a tag variable in memory to the new tag value.

In block 408, the node 102a provides the updated tag 300 to a workload scheduler 104. This may involve transmitting the updated tag 300 to the workload scheduler 104, which can receive the updated tag 300 and update a mapping 110 so as to correlate the updated tag 300 to the node 102a.

In block 410, the node 102a receives a workload tag 108 corresponding to a workload 106a assigned to the node 102a. This may involve receiving the workload tag 108 from the workload scheduler 104. The node 102 can then store the workload tag 108 in memory 204 for subsequent use.

In block 412, the node 102a determines whether the node's updated tag 300 corresponds to the workload tag 108. If so, the process can proceed to block 418 in which the node 102a can maintain the workload 106 on the node 102a. If not, the process can proceed to block 414 in which the node 102a can evict the workload 106 from the node 102a. The node 102a may also transmit an eviction notification 304 to the workload scheduler 104. In response to receiving the eviction notification 304, the workload scheduler 104 may reassign the workload 106 to another node 102c.

Figure 5:
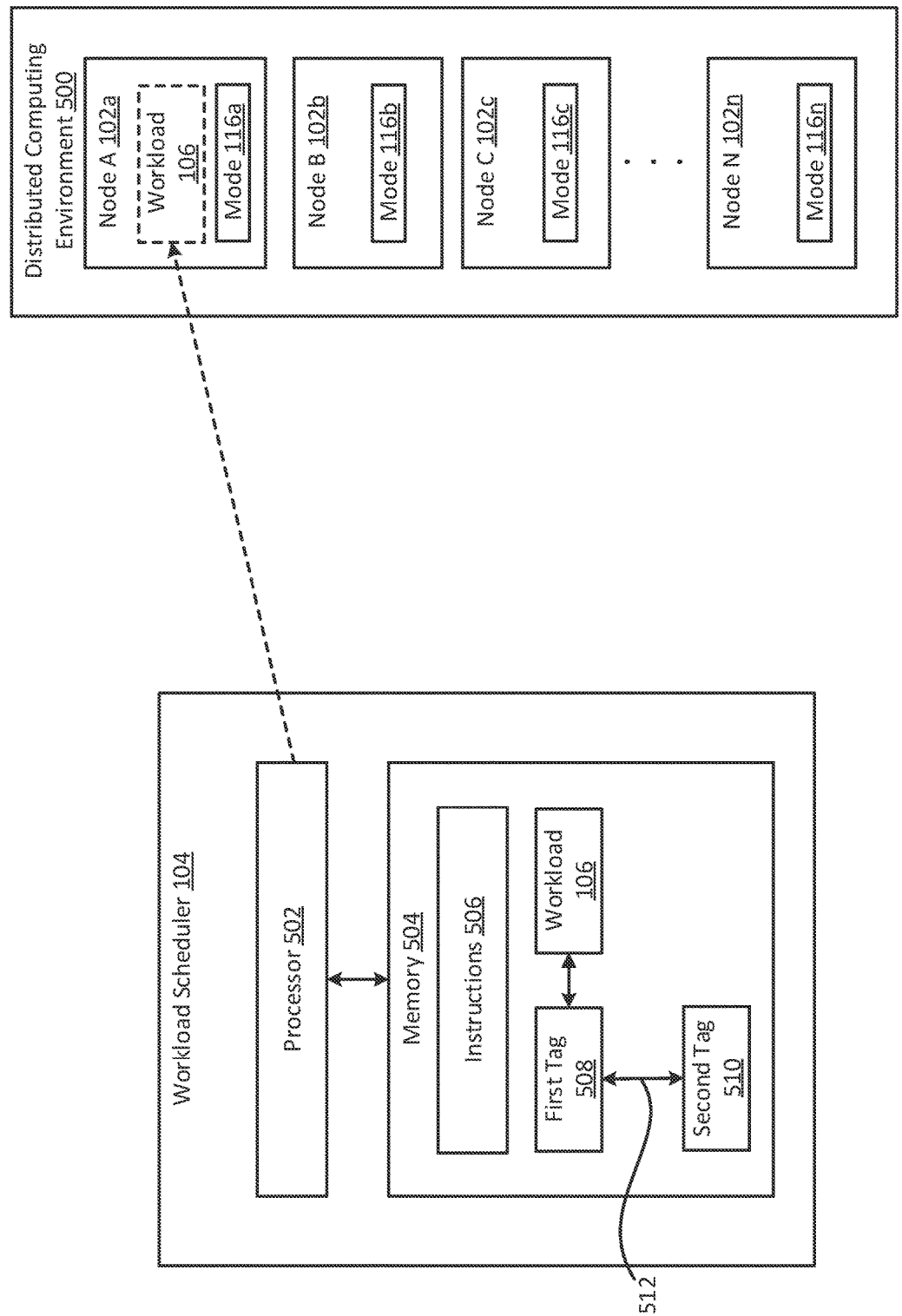
FIG. 5 is a block diagram of an example of a workload scheduler for assigning computer workloads to nodes according to some aspects of the present disclosure.

FIG. 5 is a block diagram of an example of a workload scheduler 104 for assigning computer workloads to nodes according to some aspects of the present disclosure. The workload scheduler 104 be include one or more nodes of a distributed computing environment, such as a computing cluster or cloud computing environment.

The workload scheduler 104 can include a processor 502 communicatively coupled to a memory 504. The processor 502 can be similar to the processor 202 described above, and the memory 504 can be similar to the memory 204 described above. The processor 502 can execute instructions 506 stored in memory 204 to perform one or more operations. In some examples, the instructions 506 may correspond to a workload scheduler service, which can be software capable of performing any of the functions described herein with respect to the workload scheduler 104 and the tagging engine 118.

In some examples, the processor 502 can determine a first tag 508 assigned to a workload 106. The first tag 508 can indicate a compatibility of the workload 106 with one or more energy consumption modes 116a-n employable by one or more nodes 102a-n of a distributed computing environment 500. The compatibility of the workload 106 with the one or more energy consumption modes 116a-n can reflect the ability of the workload to tolerate the one or more energy consumption modes 116a-n. The processor 502 can also determine a second tag 510 assigned to a node 102a of the distributed computing environment 500. The second tag 510 can indicate an energy consumption mode 116a employed by the node 102a. The processor 502 can determine a correspondence 512 between the first tag 508 and the second tag 510, where the correspondence 512 indicates that the workload 106 is compatible with the energy consumption mode 116a employed by the node 102a. Based on determining the correspondence 512 between the first tag 508 and the second tag 510, the processor 502 can assign the workload 106 to the node 102a.

Assigning a workload 106 to a node 102a may, in some examples, involve assigning the workload 106 to a particular software process executing on the node 102a. Multiple software processes may be executing on a node at any given time, for example using isolation mechanisms to help improve security. For instance, a node 102a can deploy its software processes within virtual machines or containers, which may improve the isolation between the software processes. A virtual machine is a relatively isolated virtual environment that includes virtualized hardware resources configured to mimic physical hardware resources. Virtual machines can be deployed on a node using a hypervisor or another deployment engine. A container is a relatively isolated virtual environment generated using isolation mechanisms built into the Linux kernel, like cgroups and namespaces. Containers can be deployed on a node from image files using Docker® or another deployment engine. In some such examples, workloads may be distributed among virtual machines or containers running on a node to improve the isolation between concurrent workloads on the node 102a.

On a given node, one or more containers may be incorporated into a pod. A pod is a higher-level abstraction of a grouping of containers that are co-located on the same physical node. The containers within a pod typically share the same computing resources (e.g., storage resources and network resources) and are considered to be relatively tightly coupled. There can be one or more pods running on an individual node. In some examples, a workload may be assigned to a given pod on a node, where the pod may be selected from among a group of pods running on the node based on the pod's capability to handle the workload.

Figure 6:
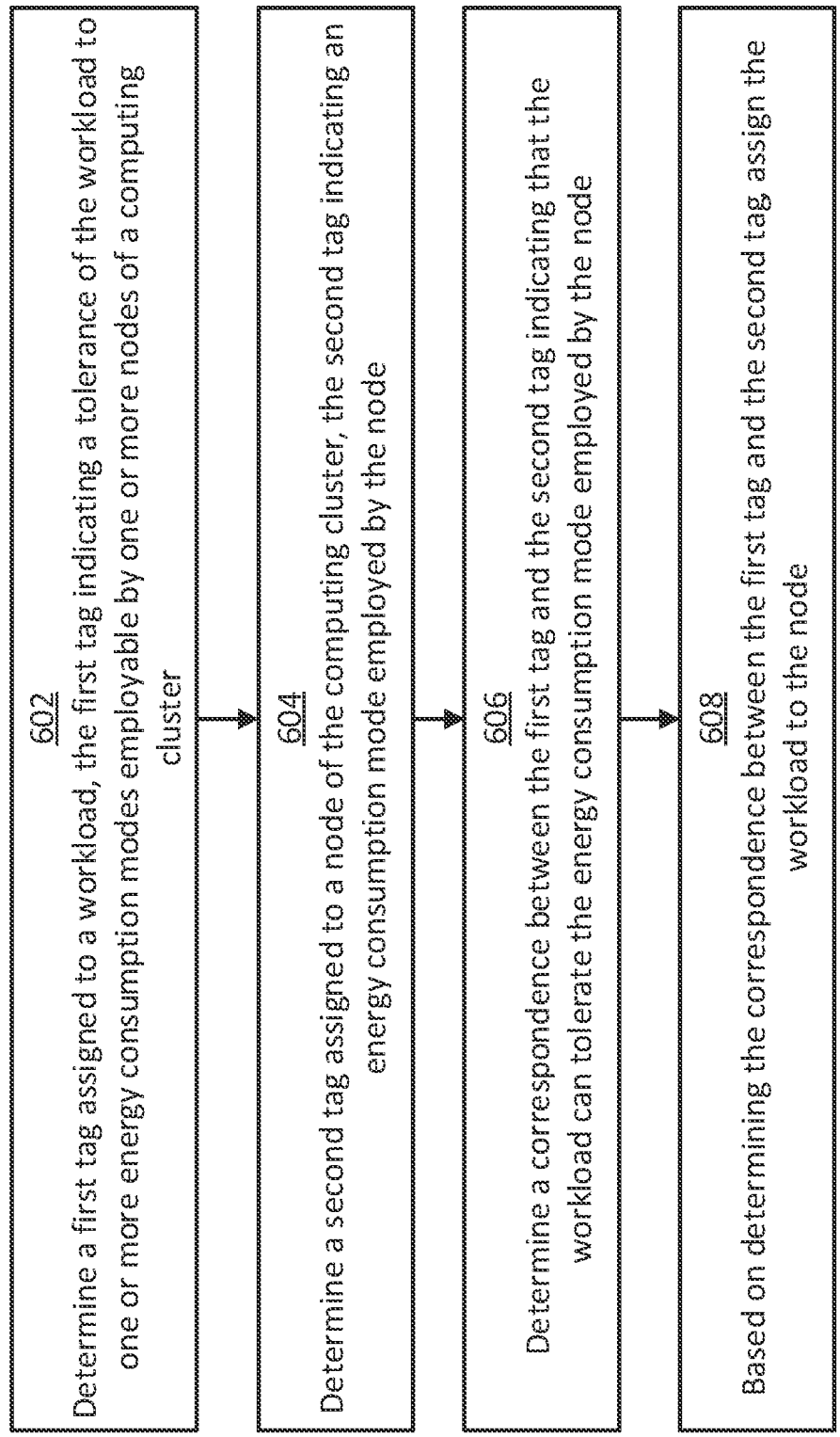
FIG. 6 is a flow chart of an example of a process for capable of being implemented by a workload scheduler according to some aspects of the present disclosure.

Referring now to FIG. 6, shown is a flow chart of an example of a process for capable of being implemented by a workload scheduler 104 according to some aspects of the present disclosure. Other examples may include more operations, fewer operations, different operations, or a different order of the operations shown in FIG. 6. The operations of FIG. 6 will now be described below with reference to the components of FIGS. 1 and 5 above.

In block 602, a processor 502 determines a first tag 508 assigned to a workload 106. The first tag 508 can indicate a compatibility of the workload 106 with one or more energy consumption modes 116a-n employable by one or more nodes 102a-n of a distributed computing environment 500. The processor 502 may determine the first tag 508 by communicating with or executing a tagging engine 118, which can assign tags to workloads.

In block 604, the processor 502 determines a second tag 510 assigned to a node 102a of the distributed computing environment 500. The second tag 510 can indicate an energy consumption mode 116a employed by the node 102a. The processor 502 can determine the second tag 510 by communicating with the node 102, which can provide the second tag 510 to the processor 502.

In block 606, the processor 502 determines a correspondence 512 between the first tag 508 and the second tag 510. The correspondence 512 can indicate that the workload 106 is compatible with the energy consumption mode 116a employed by the node 102a.

In block 608, the processor 502 assigns the workload 106 to the node 102a based on determining the correspondence 512 between the first tag 508 and the second tag 510. Assigning the workload 106 to the node 102a can involve communicating with the node 102a, for example to transmit workload data to the node 102a.

In some aspects, workloads can be assigned to nodes of a distributed computing environment based on energy consumption modes employed by the nodes according to one or more of the following examples. As used below, any reference to a series of examples is to be understood as a reference to each of those examples disjunctively (e.g., "Examples 1-4" is to be understood as "Examples 1, 2, 3, or 4").

Example #1: A non-transitory computer-readable medium comprising program code that is executable by one or more processors for causing the one or more processors to: determine a first tag assigned to a workload, the first tag indicating a compatibility of the workload with one or more energy consumption modes employable by one or more nodes of a distributed computing environment; determine a second tag assigned to a node of the distributed computing environment, the second tag indicating an energy consumption mode employed by the node; determine a correspondence between the first tag and the second tag indicating that the workload is compatible with the energy consumption mode employed by the node; and assign the workload to the node based on determining the correspondence between the first tag and the second tag.

Example #2: The non-transitory computer-readable medium of Example #1, wherein the energy consumption mode is a first energy-consumption mode, and further comprising program code that is executable by the one or more processors for causing the one or more processors to: determine a third tag assigned to another node of the distributed computing environment, the third tag indicating a second energy-consumption mode employed by the other node, the second energy-consumption mode being different from the first energy-consumption mode; determine that the first tag does not correspond to the third tag, indicating that the workload is incompatible with the second energy-consumption mode employed by the other node; and based on determining that the first tag does not correspond to the third tag, prevent the workload from being assigned to the other node.

Example #3: The non-transitory computer-readable medium of any of Examples #1-2, wherein the node includes a processor and is configured to: detect a predefined event; based on detecting the predefined event, switch from a first energy-consumption mode to a second energy-consumption mode by adjusting a clock frequency of the processor from a first clock frequency associated with the first energy-consumption mode to a second clock frequency associated with the second energy-consumption mode; based on switching from the first energy-consumption mode to the second energy-consumption mode, generate an updated tag for the node indicating that the node is in the second energy-consumption mode; and provide the updated tag for the node to a workload scheduler configured to assign workloads to nodes of the distributed computing environment based on tags of the nodes.

Example #4: The non-transitory computer-readable medium of Example #3, wherein the node is further configured to, subsequent to generating the updated tag for the node: determine that the updated tag of the node does not correspond to the first tag of the workload, indicating that the workload is incompatible with the second energy-consumption mode of the node; in response to determining that the updated tag of the node does not correspond to the first tag of the workload, evict the workload from the node prior to completing the workload; and transmit a notification to the workload scheduler indicating an eviction of the workload from the node, the workload scheduler being configured to receive the notification and responsively reassign the workload to another node employing another energy consumption mode that is different from the second energy-consumption mode.

Example #5: The non-transitory computer-readable medium of any of Examples #1-4, further comprising program code that is executable by the one or more processors for causing the one or more processors to assign the first tag to the workload based on a characteristic of the workload.

Example #6: The non-transitory computer-readable medium of any of Examples #1-5, further comprising program code that is executable by the one or more processors for causing the one or more processors to assign the first tag to the workload based on metadata associated with the workload.

Example #7: The non-transitory computer-readable medium of any of Examples #1-6, further comprising program code that is executable by the one or more processors for causing the one or more processors to assign the first tag to the workload based on a quality of service (QoS) parameter assigned to the workload.

Example #8: The non-transitory computer-readable medium of any of Examples #1-7, further comprising program code that is executable by the one or more processors for causing the one or more processors to: receive a user preference indicating how the workload is to be tagged; and assign the first tag to the workload based on the user preference.

Example #9: The non-transitory computer-readable medium of any of Examples #1-8, further comprising program code that is executable by the one or more processors for causing the one or more processors to: determine that a first plurality of nodes in the distributed computing environment have a first set of tags that correspond to the first tag of the workload; determine that a second plurality of nodes in the distributed computing environment have a second set of tags that do not correspond to the first tag of the workload; based on determining that the first plurality of nodes have the first set of tags that correspond to the first tag and determining that the second plurality of nodes have the second set of tags that do not correspond to the first tag, select the first plurality of nodes as candidate nodes to which the workload can be assigned; and based on selecting the candidate nodes, select the node from among the candidate nodes based on a predefined selection criterion.

Example #10: The non-transitory computer-readable medium of Example #9, further comprising program code that is executable by the one or more processors for causing the one or more processors to: determine the first set of tags for the first plurality of nodes by polling the first plurality of nodes; and determine the second set of tags for the second plurality of nodes by polling the second plurality of nodes.

Example #11: A method comprising: determining, by one or more processors, a first tag assigned to a workload, the first tag indicating a compatibility of the workload with one or more energy consumption modes employable by one or more nodes of a distributed computing environment; determining, by the one or more processors, a second tag assigned to a node of the distributed computing environment, the second tag indicating an energy consumption mode employed by the node; determining, by the one or more processors, a correspondence between the first tag and the second tag indicating that the workload is compatible with the energy consumption mode employed by the node; and assigning, by the one or more processors, the workload to the node based on determining the correspondence between the first tag and the second tag.

Example #12: The method of Example #11, wherein the energy consumption mode is a first energy-consumption mode, and further comprising: determining a third tag assigned to another node of the distributed computing environment, the third tag indicating a second energy-consumption mode employed by the other node, the second energy-consumption mode being different from the first energy-consumption mode; determining that the first tag does not correspond to the third tag, indicating that the workload is incompatible with the second energy-consumption mode employed by the other node; and based on determining that the first tag does not correspond to the third tag, preventing the workload from being assigned to the other node.

Example #13: The method of any of Examples #11-12, wherein the node includes a processor and is configured to: detect a predefined event; based on detecting the predefined event, switch from a first energy-consumption mode to a second energy-consumption mode by adjusting a clock frequency of the processor from a first clock frequency associated with the first energy-consumption mode to a second clock frequency associated with the second energy-consumption mode; based on switching from the first energy-consumption mode to the second energy-consumption mode, generate an updated tag for the node indicating that the node is in the second energy-consumption mode; and provide the updated tag for the node to a workload scheduler configured to assign workloads to nodes of the distributed computing environment based on tags of the nodes.

Example #14: The method of Example #13, wherein the node is further configured to, subsequent to generating the updated tag for the node: determine that the updated tag of the node does not correspond to the first tag of the workload, indicating that the workload is incompatible with the second energy-consumption mode of the node; in response to determining that the updated tag of the node does not correspond to the first tag of the workload, evict the workload from the node prior to completing the workload; and transmit a notification to the workload scheduler indicating an eviction of the workload from the node, the workload scheduler being configured to receive the notification and responsively reassign the workload to another node employing another energy consumption mode that is different from the second energy-consumption mode.

Example #15: The method of any of Examples #11-14, further comprising assigning the first tag to the workload based on a characteristic of the workload.

Example #16: The method of any of Examples #11-15, further comprising assigning the first tag to the workload based on metadata associated with the workload.

Example #17: The method of any of Examples #11-16, further comprising assigning the first tag to the workload based on a quality of service (QoS) parameter assigned to the workload.

Example #18: The method of any of Examples #11-17, further comprising: receiving a user preference indicating how the workload is to be tagged; and assigning the first tag to the workload based on the user preference.

Example #19: The method of any of Examples #11-18, further comprising: determining that a first plurality of nodes in the distributed computing environment have a first set of tags that correspond to the first tag of the workload; determining that a second plurality of nodes in the distributed computing environment have a second set of tags that do not correspond to the first tag of the workload; based on determining that the first plurality of nodes have the first set of tags that correspond to the first tag and determining that the second plurality of nodes have the second set of tags that do not correspond to the first tag, selecting the first plurality of nodes as candidate nodes to which the workload can be assigned; and based on selecting the candidate nodes, selecting the node from among the candidate nodes based on a predefined selection criterion.

Example #20: A system comprising: one or more processors; and a memory comprising instructions that are executable by the one or more processors for causing the one or more processors to: determine a first tag assigned to a workload, the first tag indicating a compatibility of the workload with one or more energy consumption modes employable by one or more nodes of a distributed computing environment; determine a second tag assigned to a node of the distributed computing environment, the second tag indicating an energy consumption mode employed by the node; determine a correspondence between the first tag and the second tag indicating that the workload is compatible with the energy consumption mode employed by the node; and assign the workload to the node based on determining the correspondence between the first tag and the second tag.

Example #21: A non-transitory computer-readable medium comprising program code that is executable by one or more processors of a node for causing the one or more processors to: detect a predefined event; based on detecting the predefined event, adjust a clock frequency of a processor of the node from a first clock frequency to a second clock frequency; based on adjusting the clock frequency from the first clock frequency to the second clock frequency, update a tag for the node from a first tag to a second tag, the first tag being associated with the first clock frequency and the second tag being associated with the second clock frequency; and provide the second tag to a workload scheduler that is external to the node, the workload scheduler being configured to assign workloads to nodes of a distributed computing environment based on tags of the nodes.

Example #22: The non-transitory computer-readable medium of Example #21, wherein the predefined event is a first predefined event, and further comprising program code that is executable by the one or more processors of the node for causing the one or more processors to: detect a second predefined event that is different from the first predefined event; based on detecting the second predefined event, adjust the clock frequency of the processor from the second clock frequency to the first clock frequency; based on adjusting the clock frequency from the second clock frequency to the first clock frequency, update the tag for the node from the second tag to the first tag; and subsequent to updating the tag, provide the first tag to the workload scheduler.

Example #23: The non-transitory computer-readable medium of Example #21, wherein the predefined event is a first predefined event, and further comprising program code that is executable by the one or more processors of the node for causing the one or more processors to: detect a second predefined event that is different from the first predefined event; based on detecting the second predefined event, adjust the clock frequency of the processor of the node from the second clock frequency to a third clock frequency that is different from the first clock frequency; based on adjusting the clock frequency from the second clock frequency to the third clock frequency, update the tag for the node from the second tag to a third tag, the third tag being associated with the third clock frequency; and subsequent to updating the tag, provide the third tag to the workload scheduler.

Example #24: The non-transitory computer-readable medium of Example #21, further comprising program code that is executable by the one or more processors of the node for causing the one or more processors to, subsequent to updating the tag of the node from the first tag to the second tag: determine that the second tag of the node does not correspond to a particular tag for a workload assigned to the node by the workload scheduler; in response to determining that the second tag of the node does not correspond to the particular tag of the workload, evict the workload from the node prior to completing the workload; and transmit a notification to the workload scheduler indicating an eviction of the workload from the node, the workload scheduler being configured to receive the notification and responsively reassign the workload to another node of the distributed computing environment.

Example #25: The non-transitory computer-readable medium of any of Examples #21-24, further comprising program code that is executable by the one or more processors of the node for causing the one or more processors to: receive configuration data indicating a plurality of predefined events that are to be detected by the node for triggering adjustments to the clock frequency of the processor, the plurality of predefined events including the predefined event; and detect the predefined event based on the configuration data.

Example #26: The non-transitory computer-readable medium of any of Examples #21-25, wherein the workload scheduler is configured to assign a workload to the node based on a particular tag associated with the workload, the particular tag indicating a compatibility of the workload with one or more energy consumption modes employable by one or more nodes of the distributed computing environment.

Example #27: The non-transitory computer-readable medium of Example #26, wherein the workload scheduler is configured to: select the particular tag, from among a plurality of tags, based on a characteristic of the workload; and based on selecting the particular tag, assign the particular tag to the workload.

Example #28: A method comprising: detecting, by a node including a processor, a predefined event; adjusting, by the node, a clock frequency of the processor from a first clock frequency to a second clock frequency based on detecting the predefined event; updating, by the node, a tag for the node from a first tag to a second tag based on adjusting the clock frequency from the first clock frequency to the second clock frequency, the first tag being associated with the first clock frequency and the second tag being associated with the second clock frequency; and providing, by the node, the second tag to a workload scheduler that is external to the node, the workload scheduler being configured to assign workloads to nodes of a distributed computing environment based on tags of the nodes.

Example #29: The method of Example #28, wherein the predefined event is a first predefined event, and further comprising: detecting a second predefined event that is different from the first predefined event; based on detecting the second predefined event, adjusting the clock frequency of the processor from the second clock frequency to the first clock frequency; based on adjusting the clock frequency from the second clock frequency to the first clock frequency, updating the tag for the node from the second tag to the first tag; and subsequent to updating the tag, providing the first tag to the workload scheduler.

Example #30: The method of Example #28, wherein the predefined event is a first predefined event, and further comprising: detecting a second predefined event that is different from the first predefined event; based on detecting the second predefined event, adjusting the clock frequency of the processor of the node from the second clock frequency to a third clock frequency that is different from the first clock frequency; based on adjusting the clock frequency from the second clock frequency to the third clock frequency, updating the tag for the node from the second tag to a third tag, the third tag being associated with the third clock frequency; and subsequent to updating the tag, providing the third tag to the workload scheduler.

Example #31: The method of Example #28, further comprising, subsequent to updating the tag of the node from the first tag to the second tag: determining that the second tag of the node does not correspond to a particular tag for a workload assigned to the node by the workload scheduler; in response to determining that the second tag of the node does not correspond to the particular tag of the workload, evicting the workload from the node prior to completing the workload; and transmitting a notification to the workload scheduler indicating an eviction of the workload from the node, the workload scheduler being configured to receive the notification and responsively reassign the workload to another node of the distributed computing environment.

Example #32: The method of any of Examples #28-31, further comprising: receiving configuration data indicating a plurality of predefined events that are to be detected by the node for triggering adjustments to the clock frequency of the processor, the plurality of predefined events including the predefined event; and detecting the predefined event based on the configuration data.

Example #33: The method of any of Examples #28-31, wherein the workload scheduler is configured to assign a workload to the node based on a particular tag associated with the workload, the particular tag indicating a compatibility of the workload with one or more energy consumption modes employable by one or more nodes of the distributed computing environment.

Example #34: The method of Example #33, wherein the workload scheduler is configured to: select the particular tag, from among a plurality of tags, based on a characteristic of the workload; and based on selecting the particular tag, assign the particular tag to the workload.

Example #35: A node comprising: one or more processors; and one or more memories comprising instructions that are executable by the one or more processors for causing the one or more processors to: detect a predefined event; adjust a clock frequency of a processor of the node from a first clock frequency to a second clock frequency based on detecting the predefined event; update a tag for the node from a first tag to a second tag based on adjusting the clock frequency from the first clock frequency to the second clock frequency, the first tag being associated with the first clock frequency and the second tag being associated with the second clock frequency; and provide the second tag to a workload scheduler that is external to the node, the workload scheduler being configured to assign workloads to nodes of a distributed computing environment based on tags of the nodes.

Example #36: A system comprising: means for determining a first tag assigned to a workload, the first tag indicating a compatibility of the workload with one or more energy consumption modes employable by one or more nodes of a distributed computing environment; means for determining a second tag assigned to a node of the distributed computing environment, the second tag indicating an energy consumption mode employed by the node; means for determining a correspondence between the first tag and the second tag indicating that the workload is compatible with the energy consumption mode employed by the node; and means for assigning the workload to the node based on determining the correspondence between the first tag and the second tag.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example described herein can be combined with any other examples to yield further examples.

The invention claimed is:

1. A non-transitory computer-readable medium comprising program code that is executable by one or more processors for causing the one or more processors to:
   determine a first tag assigned to a workload, the first tag indicating a compatibility of the workload with one or more energy consumption modes employable by one or more nodes of a distributed computing environment;
   determine a second tag assigned to a node of the distributed computing environment, the second tag indicating a first energy-consumption mode employed by the node;
   determine a correspondence between the first tag and the second tag indicating that the workload is compatible with the first energy-consumption mode employed by the node; and
   assign the workload to the node based on determining the correspondence between the first tag and the second tag;
   wherein the node is configured to, after the workload has been assigned to the node:
      generate an updated tag indicating that the node is in a second energy-consumption mode;
      determine that the updated tag of the node does not correspond to the first tag of the workload, indicating that the workload is incompatible with the second energy-consumption mode of the node; and
      in response to determining that the updated tag of the node does not correspond to the first tag of the workload, evict the workload from the node prior to completing the workload.

2. The non-transitory computer-readable medium of claim 1, further comprising program code that is executable by the one or more processors for causing the one or more processors to:
   determine a third tag assigned to another node of the distributed computing environment, the third tag indicating that the second energy-consumption mode is employed by the other node, the second energy-consumption mode being different from the first energy-consumption mode;
   determine that the first tag does not correspond to the third tag, indicating that the workload is incompatible with the second energy-consumption mode employed by the other node; and
   based on determining that the first tag does not correspond to the third tag, prevent the workload from being assigned to the other node.

3. The non-transitory computer-readable medium of claim 1, wherein the node includes a processor and is configured to:
   detect a predefined event;
   based on detecting the predefined event, switch from the first energy-consumption mode to the second energy-consumption mode by adjusting a clock frequency of the processor from a first clock frequency associated with the first energy-consumption mode to a second clock frequency associated with the second energy-consumption mode;
   based on switching from the first energy-consumption mode to the second energy-consumption mode, generate the updated tag for the node indicating that the node is in the second energy-consumption mode; and
   provide the updated tag for the node to a workload scheduler configured to assign workloads to nodes of the distributed computing environment based on tags of the nodes.

4. The non-transitory computer-readable medium of claim 3, wherein the node is further configured to:
   transmit a notification to the workload scheduler indicating an eviction of the workload from the node, the workload scheduler being configured to receive the notification and responsively reassign the workload to another node employing another energy consumption mode that is different from the second energy-consumption mode.

5. The non-transitory computer-readable medium of claim 1, further comprising program code that is executable by the one or more processors for causing the one or more processors to assign the first tag to the workload based on a characteristic of the workload.

6. The non-transitory computer-readable medium of claim 1, further comprising program code that is executable by the one or more processors for causing the one or more processors to assign the first tag to the workload based on metadata associated with the workload.

7. The non-transitory computer-readable medium of claim 1, further comprising program code that is executable by the one or more processors for causing the one or more processors to assign the first tag to the workload based on a quality of service (QoS) parameter assigned to the workload.

8. The non-transitory computer-readable medium of claim 1, further comprising program code that is executable by the one or more processors for causing the one or more processors to:
   receive a user preference indicating how the workload is to be tagged; and
   assign the first tag to the workload based on the user preference.

9. The non-transitory computer-readable medium of claim 1, further comprising program code that is executable by the one or more processors for causing the one or more processors to:
   determine that a first plurality of nodes in the distributed computing environment have a first set of tags that correspond to the first tag of the workload;
   determine that a second plurality of nodes in the distributed computing environment have a second set of tags that do not correspond to the first tag of the workload;
   based on determining that the first plurality of nodes have the first set of tags that correspond to the first tag and determining that the second plurality of nodes have the second set of tags that do not correspond to the first tag, select the first plurality of nodes as candidate nodes to which the workload can be assigned; and
   based on selecting the candidate nodes, select the node from among the candidate nodes based on a predefined selection criterion.

10. The non-transitory computer-readable medium of claim 9, further comprising program code that is executable by the one or more processors for causing the one or more processors to:

determine the first set of tags for the first plurality of nodes by polling the first plurality of nodes; and
determine the second set of tags for the second plurality of nodes by polling the second plurality of nodes.

11. A method comprising:
determining, by one or more processors, a first tag assigned to a workload, the first tag indicating a compatibility of the workload with one or more energy consumption modes employable by one or more nodes of a distributed computing environment;
determining, by the one or more processors, a second tag assigned to a node of the distributed computing environment, the second tag indicating a first energy-consumption mode employed by the node;
determining, by the one or more processors, a correspondence between the first tag and the second tag indicating that the workload is compatible with the first energy-consumption mode employed by the node; and
assigning, by the one or more processors, the workload to the node based on determining the correspondence between the first tag and the second tag;
wherein after the workload has been assigned to the node, the node:
generates an updated tag indicating that the node is in a second energy-consumption mode;
determines that the updated tag of the node does not correspond to the first tag of the workload, indicating that the workload is incompatible with the second energy-consumption mode of the node; and
in response to determining that the updated tag of the node does not correspond to the first tag of the workload, evicts the workload from the node prior to completing the workload.

12. The method of claim 11, further comprising:
determining a third tag assigned to another node of the distributed computing environment, the third tag indicating that the second energy-consumption mode is employed by the other node, the second energy-consumption mode being different from the first energy-consumption mode;
determining that the first tag does not correspond to the third tag, indicating that the workload is incompatible with the second energy-consumption mode employed by the other node; and
based on determining that the first tag does not correspond to the third tag, preventing the workload from being assigned to the other node.

13. The method of claim 11, wherein the node includes a processor and is configured to:
detect a predefined event;
based on detecting the predefined event, switch from the first energy-consumption mode to the second energy-consumption mode by adjusting a clock frequency of the processor from a first clock frequency associated with the first energy-consumption mode to a second clock frequency associated with the second energy-consumption mode;
based on switching from the first energy-consumption mode to the second energy-consumption mode, generate the updated tag for the node indicating that the node is in the second energy-consumption mode; and
provide the updated tag for the node to a workload scheduler configured to assign workloads to nodes of the distributed computing environment based on tags of the nodes.

14. The method of claim 13, wherein the node is further configured to:
transmit a notification to the workload scheduler indicating an eviction of the workload from the node, the workload scheduler being configured to receive the notification and responsively reassign the workload to another node employing another energy consumption mode that is different from the second energy-consumption mode.

15. The method of claim 11, further comprising assigning the first tag to the workload based on a characteristic of the workload.

16. The method of claim 11, further comprising assigning the first tag to the workload based on metadata associated with the workload.

17. The method of claim 11, further comprising assigning the first tag to the workload based on a quality of service (QoS) parameter assigned to the workload.

18. The method of claim 11, further comprising:
determining that a first plurality of nodes in the distributed computing environment have a first set of tags that correspond to the first tag of the workload;
determining that a second plurality of nodes in the distributed computing environment have a second set of tags that do not correspond to the first tag of the workload;
based on determining that the first plurality of nodes have the first set of tags that correspond to the first tag and determining that the second plurality of nodes have the second set of tags that do not correspond to the first tag, selecting the first plurality of nodes as candidate nodes to which the workload can be assigned; and
based on selecting the candidate nodes, selecting the node from among the candidate nodes based on a predefined selection criterion.

19. A system comprising:
one or more processors; and
a memory comprising instructions that are executable by the one or more processors for causing the one or more processors to:
determine a first tag assigned to a workload, the first tag indicating a compatibility of the workload with one or more energy consumption modes employable by one or more nodes of a distributed computing environment;
determine a second tag assigned to a node of the distributed computing environment, the second tag indicating a first energy-consumption mode employed by the node;
determine a correspondence between the first tag and the second tag indicating that the workload is compatible with the first energy-consumption mode employed by the node; and
assign the workload to the node based on determining the correspondence between the first tag and the second tag;
wherein the node is configured to, after the workload has been assigned to the node:
generate an updated tag indicating that the node is in a second energy-consumption mode;
determine that the updated tag of the node does not correspond to the first tag of the workload, indicating that the workload is incompatible with the second energy-consumption mode of the node; and
in response to determining that the updated tag of the node does not correspond to the first tag of the workload, evict the workload from the node prior to completing the workload.

20. The non-transitory computer-readable medium of claim 1, wherein the first tag is a classification that is assigned by a tagging engine.

* * * * *